Dec. 14, 1926.
G. P. LUCKEY
1,610,559
TACHOMETER
Filed Nov. 8, 1923
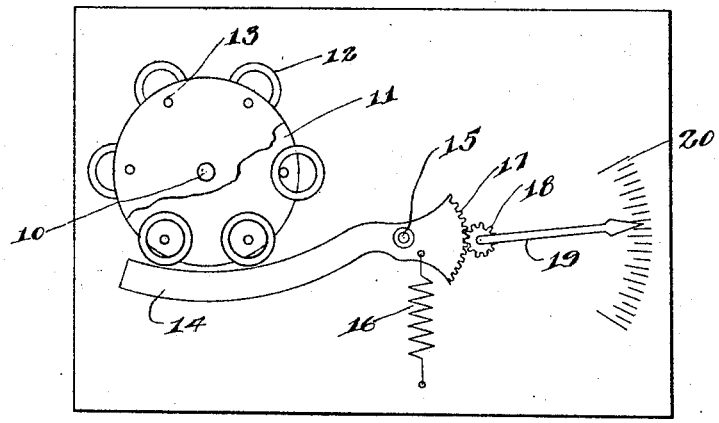
INVENTOR
George P. Luckey
BY Robert H. Young
ATTORNEY Patented Dec. 14, 1926.

1,610,559

UNITED STATES PATENT OFFICE.

GEORGE P. LUCKEY, OF DAYTON, OHIO.

TACHOMETER.

Application filed November 8, 1923. Serial No. 673,528.

This invention relates to tachometers generally, but more particularly to a tachometer embodying centrifugal means for indicating the rotary speed of a device.

The invention is capable of application to various forms of speed measuring devices and in diverse ways, but essentially comprises a rotary part revoluble at speeds varying as the speeds of a shaft or other device whose speed is to be measured having centrifugally sensitive means such as weights, liquid, or the like, revoluble therewith, and spring constrained means acted upon by the centrifugally sensitive means to measure the speed of the rotary part.

In the accompanying drawing, I have illustrated more or less diagrammatically a tachometer involving the invention.

Referring to the drawing, the reference numeral 10 is applied to a shaft constituting either an extended integral portion of a shaft of a machine or engine or other device whose speed is to be measured or else forming a piece coupled to such a shaft. A rotary disk 11 turns with the shaft 10 and has a plurality of centrifugal weights in the form of rings 12, loosely mounted thereon on pins 13, which fly out under centrifugal action beyond the periphery of the disk 11 to strike a lever index member 14. The latter is pivoted at 15 and has its free end disposed alongside the disk 11 approximately tangential with respect thereto and within the path of sweep of the rings 12. The lever 14 is constrained by a spring 16 toward movement inwardly relative to the disk 11 so that the tension of this spring must be overcome by the rings 12 in deflecting the end of the lever in the operation of the tachometer. It is this balancing by the spring 16 of the centrifugal force exerted by the rings 12 which reflects variations in the speed of the shaft, since the centrifugal force of these movable parts tending to throw them outwardly is proportionate to the speed at which they are revolved.

The lever 14 has a sector gear 17 on its inner end meshing with a pinion 18 carrying a needle 19 movable relative to a dial 20. The latter is provided with indicia, such as Revolutions per minute, or other values. It will be noted that an even scale may be obtained with the present structure. This is due to the fact that the centrifugal force of an object being revolved varies as the square of the speed and the counteracting or balancing force of a spring upon deflection may be made to vary as the square of its deflection by suitable arrangement of the pivots and points of attachment. The centrifugal parts in this case are the rings 12 and the spring subject to deflection under the centrifugal force exerted by the rings 12 is the spring 16. In the drawing, it will be noted that the pins 13 normally serve as stops or abutments for the rings 12 to hold them while they are thrown out under centrifugal action and that when the rings arrive at the lever 14, the latter moves them inwardly so that the full extent of centrifugal force exerted thereby is expended against the lever 14 so that an accurate calculation of the speed may be made from the extent of resulting deflection of the lever and hence the needle 19.

I claim:—

In a tachometer, in combination, a rotary disk revoluble at speeds varying as the speeds of a device whose speed is to be measured, pins on said disk adjacent the periphery thereof, rings loosely held on said pins so as to fly out under centrifugal action beyond the periphery of said disk, an approximately tangentially disposed lever member adjacent said disk in the path of sweep of said rings, a spring yieldingly restraining said member, and a device operated from said lever to indicate directly the speed of revolution of said device.

In testimony whereof I affix my signature.

GEORGE P. LUCKEY.